United States Patent

[11] 3,533,517

| [72] | Inventor | Henry A. Heide<br>Addison, Illinois |
|---|---|---|
| [21] | Appl. No. | 763,656 |
| [22] | Filed | Sept. 30, 1968 |
| [45] | Patented | Oct. 13, 1970 |
| [73] | Assignee | Velten & Pulver, Inc.<br>Chicago Ridge, Illinois<br>a corporation of Illinois |

[54] AUTOMATIC PAN STACKER
16 Claims, 12 Drawing Figs.

[52] U.S. Cl. .................................................. 214/6,
198/163
[51] Int. Cl. ............................................ B65g 57/06
[50] Field of Search ............................... 214/6, 6.1,
6(H), 6(S), 6(P); 271/86, 88, 68, 69

[56] References Cited
UNITED STATES PATENTS

| 2,273,689 | 2/1942 | Boron et al. | 214/6(K)UX |
|---|---|---|---|
| 2,637,450 | 5/1953 | Eshelman | 214/6(K)UX |
| 2,821,391 | 1/1958 | Buccicone | 214/6(S)UX |
| 2,984,838 | 5/1961 | Parker | 214/6(K)UX |
| 3,054,516 | 9/1962 | Joa | 214/6(K)UX |
| 3,312,357 | 4/1967 | Stephens et al. | 214/6(K)UX |
| 3,381,829 | 5/1968 | Turner | 214/6(K)UX |
| 3,415,389 | 12/1968 | Smith | 214/6(K)UX |
| 3,429,459 | 2/1969 | Paul et al. | 214/6(K)UX |
| 3,430,784 | 3/1969 | Hall | 214/6(K)UX |
| 3,447,695 | 6/1969 | Krepp et al. | 214/6(K)UX |

*Primary Examiner*—Gerald M. Forlenza
*Assistant Examiner*—Robert J. Spar
*Attorney*—Prangley, Clayton, Mullin, Dithmar and Vogel

ABSTRACT: There is disclosed a machine for stacking bread pans including an infeed conveyor for conveying pans to a pair of pan supports, an air cushioned stop by the supports for positioning pans thereon, an elevator having a pair of spaced-apart pan carriers thereon below the supports, photoelectric control mechanism for an air motor for moving the supports apart to drop a pan onto the carriers, and photoelectric control mechanism for moving the carriers downwardly in a stepwise manner as pans are stacked thereon, the carriers being supported by an endless chain mounted on upper and lower sprockets.

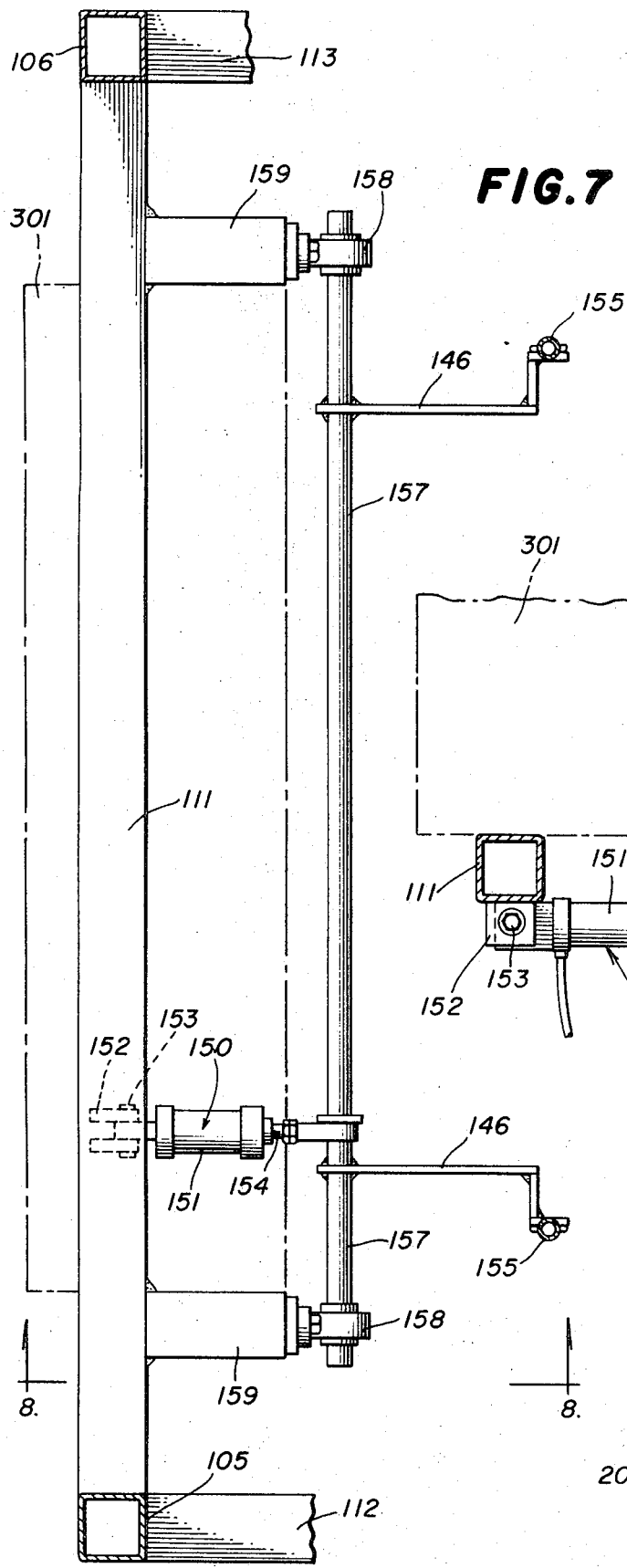
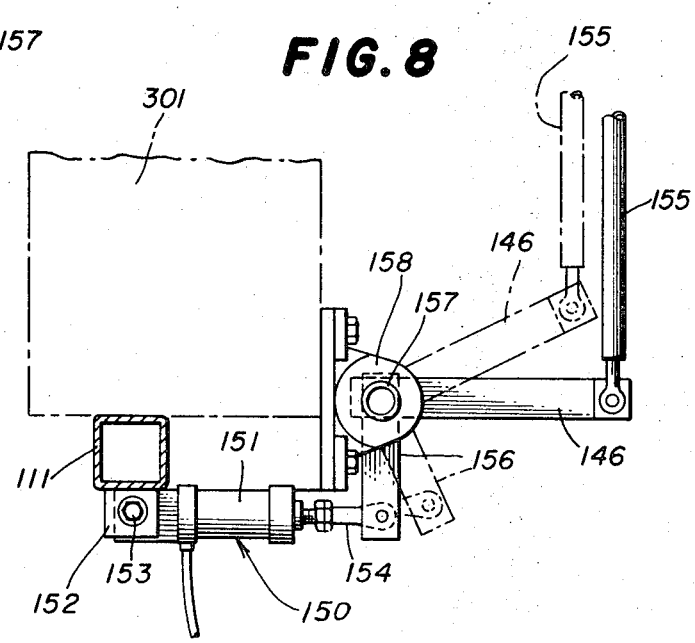
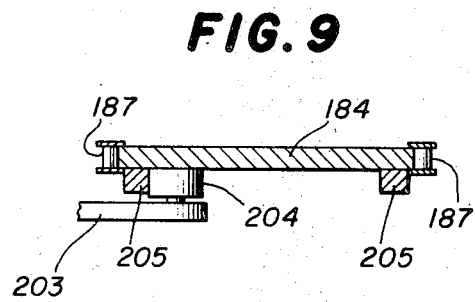
FIG. 7
FIG. 8
FIG. 9

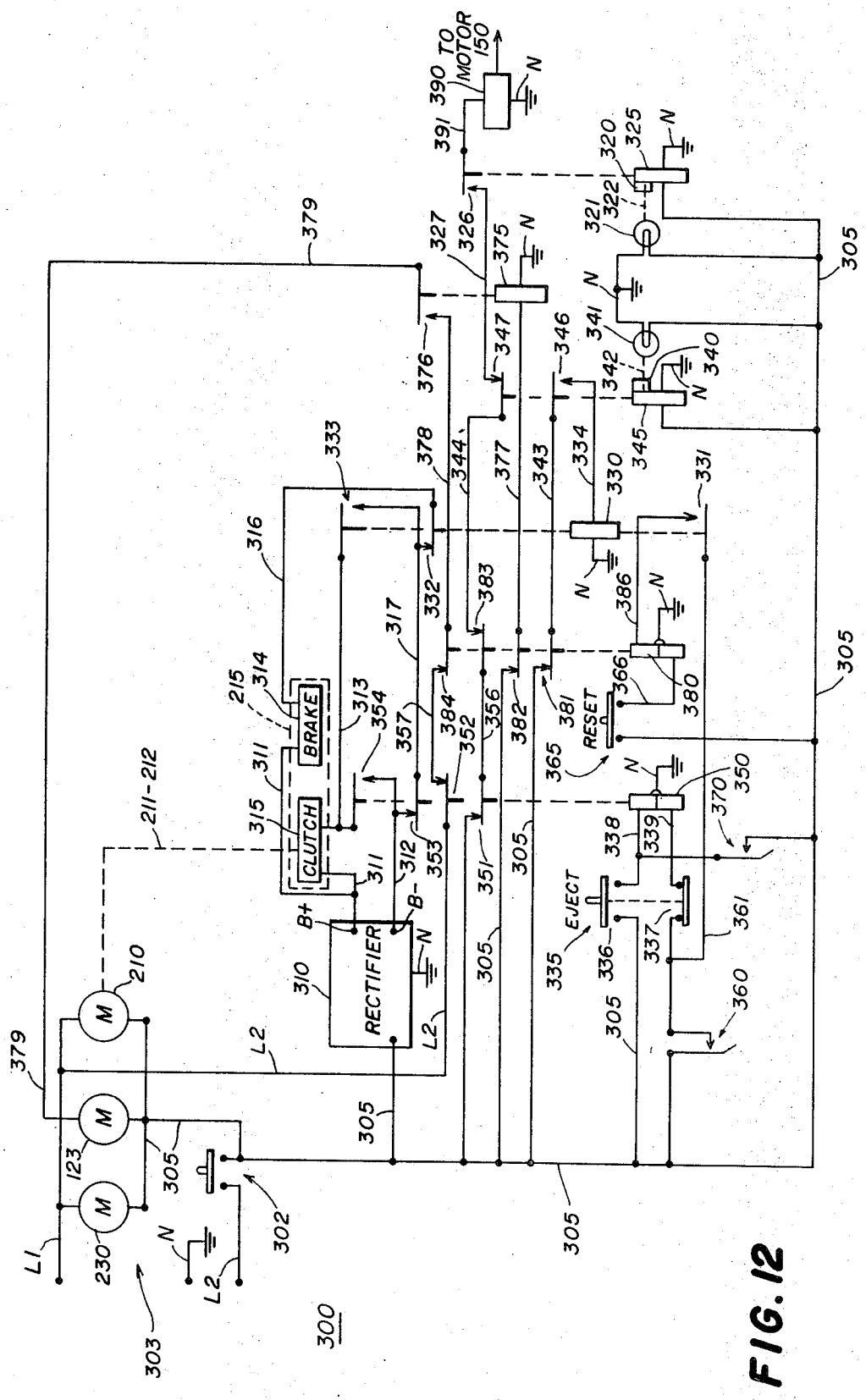

AUTOMATIC PAN STACKER

The present invention relates to machines for stacking bread pans and the like, and particularly to improved control mechanism and actuating mechanism for the several pan handling components thereof.

It is an important object of the invention to provide an improved machine for stacking bread pans and the like comprising an infeed conveyor for conveying pans to a pan support mounted adjacent to the discharge end of the infeed conveyor, the pan support having a first position for receiving and arresting the movement of pans from the infeed conveyor to place the pans in a predetermined position and a second position for releasing an arrested pan to permit the arrested pan to drop under the urging of gravity, a pan carrier mounted below the pan support in position to catch a pan dropped therefrom, support drive mechanism for moving the pan support between the first and second positions thereof sequentially to arrest pans and to drop arrested pans upon the pan carrier to form a stack of pans thereon, carrier drive mechanism for moving the pan carrier downwardly and away from the pan support as pans are stacked on the pan carrier, a photoelectric pan position detector for detecting the presence of a pan in the predetermined position on the pan support, and control mechanism responsive to the sensing by the photoelectric detector of a pan in the predetermined position upon the pan support for operating the support drive mechanism to move the pan support from the first position thereof to the second position thereof to drop the pan positioned thereon and to move the pan support to the first position thereof.

Another object of the invention is to provide a machine for stacking bread pans and the like of the type set forth, wherein a pair of laterally spaced-apart elongated pan supports is provided, the pan supports being moved away from each other to drop a pan position thereon, and a pair of laterally spaced-apart pan carriers is provided for catching the pans dropped from the pan supports.

Another object of the invention is to provide a machine for stacking bread pans and the like of the type set forth, wherein the pan support is disposed downwardly with respect to the discharge end of the infeed conveyor so that the leading end of a pan fed from the infeed conveyor tilts downwardly to rest upon the pan support and to slide therealong until the trailing end of the pan falls from the infeed conveyor upon the pan support, the photoelectric pan position detector being disposed closely above the pan support and adjacent to the discharge end of the infeed conveyor to detect the falling of the trailing end of the pan onto the pan support.

Another object of the invention is to provide a machine for stacking bread pans and the like of the type set forth, wherein the pan carrier is provided with a photoelectric stack position detector positioned at a predetermined point below the pan support for sensing the presence of a stack of pans extending upwardly beyond the predetermined point, and control mechanism responsive to the sensing by the photoelectric detector of a stack of pans extending upwardly beyond a predetermined point for operating the carrier drive mechanism to move the carrier downwardly away from the pan support until the upper end of the stack of pans on the pan carrier is below the predetermined point.

A further object of the invention is to provide in a machine for stacking bread pans and the like of the type set forth a stop plate movably mounted adjacent to the pan support at the end thereof opposite the infeed conveyor for engaging the adjacent end of a pan as it is fed onto the pan support to arrest the movement of the pan in a predetermined position, and cushion mechanism for the stop plate for absorbing the kinetic energy of the pans in arresting the movement thereof and for returning the stop plate to a predetermined position so as to place the pans in a predetermined position.

A still further object of the invention is to provide in a machine for stacking bread pans and the like an improved pair of elevators mounted below the pan support and each including an upper drive sprocket positioned immediately below the pan support and a lower drive sprocket disposed vertically below the upper drive sprocket and a drive chain interconnecting the drive sprockets, and two pan carriers respectively mounted on the drive chains and horizontally aligned and in position to catch a pan dropped from the pan support when on the adjacent facing reaches respectively of the chains.

Further features of the invention pertain to the particular arrangement of the parts of the machine for stacking bread pans and the like, whereby the above-outlined and additional operating features thereof are attained.

The invention, both as to its organization and method of operation, together with further objects and advantages thereof, will best be understood by reference to the following specification taken in connection with the accompanying drawings, in which:

FIG. 7 is an enlarged fragmentary view partly in section along the line 7–7 of FIG. 2;

FIG. 8 is a view in vertical section along the line 8–8 of FIG. 7;

FIG. 9 is a greatly enlarged view in horizontal section along the line 9–9 in FIG. 1;

FIG. 12 is a schematic electrical diagrammatic view of the control circuit of the machine of FIGS. 1 to 11.

Figure 1:
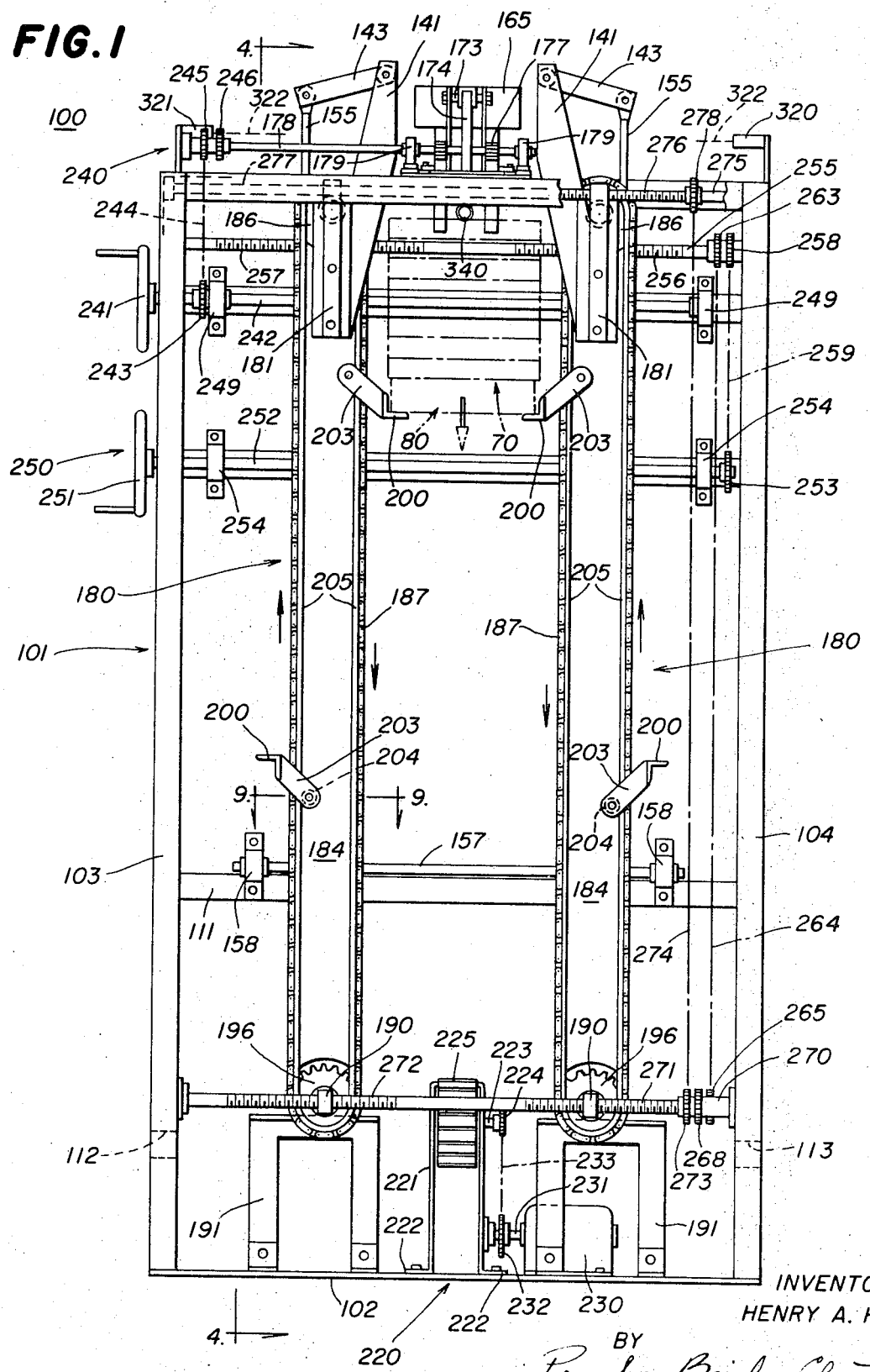
FIG. 1 is a front elevational view of a machine for stacking bread pans and the like, made in accordance with and embodying the principles of the present invention.
Figure 2:
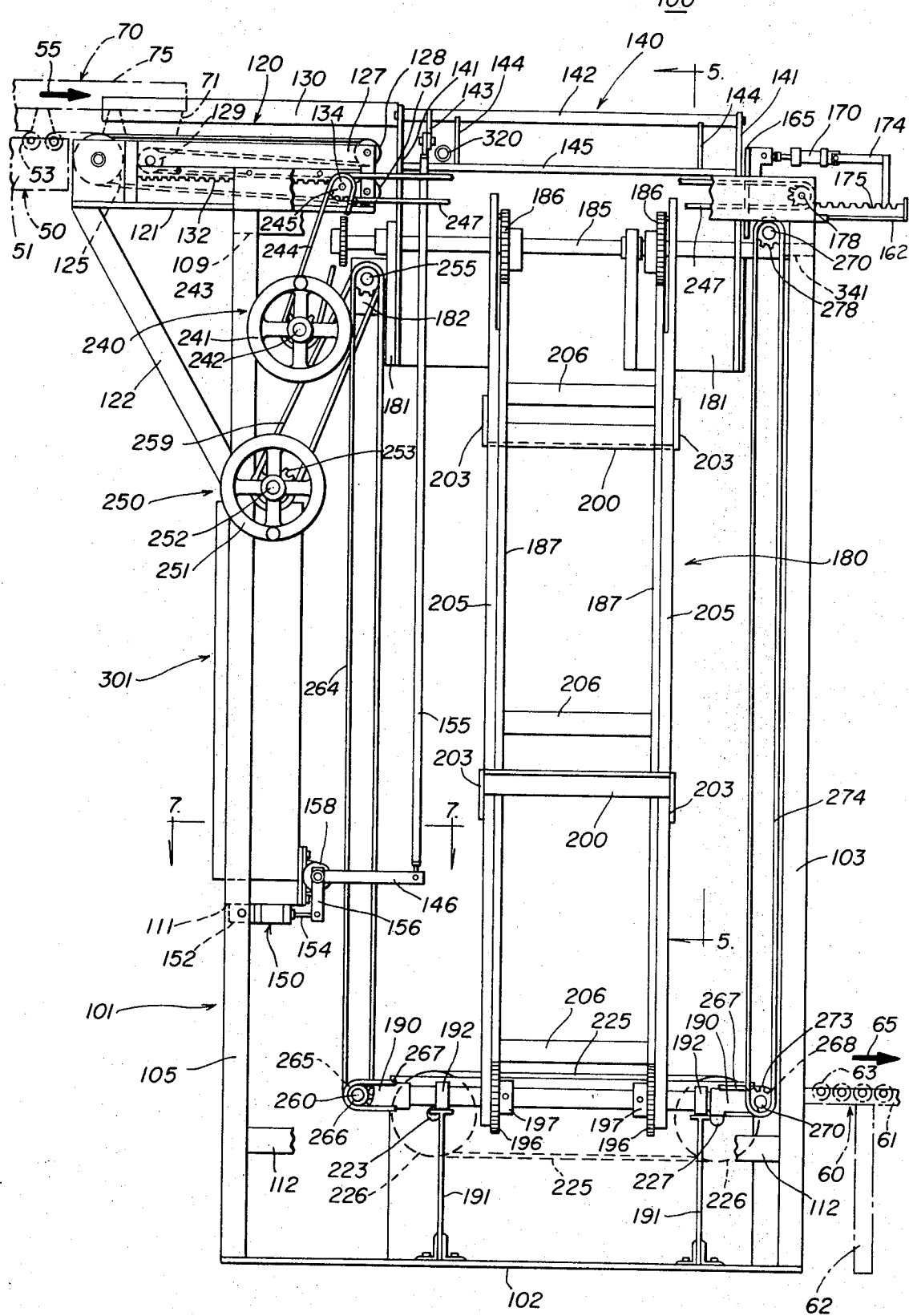
FIG. 2 is a side elevational view of the machine of FIG. 1 with certain portions broken away and illustrating diagrammatically the associated supply conveyor and stack receiving conveyor.
Figure 3:
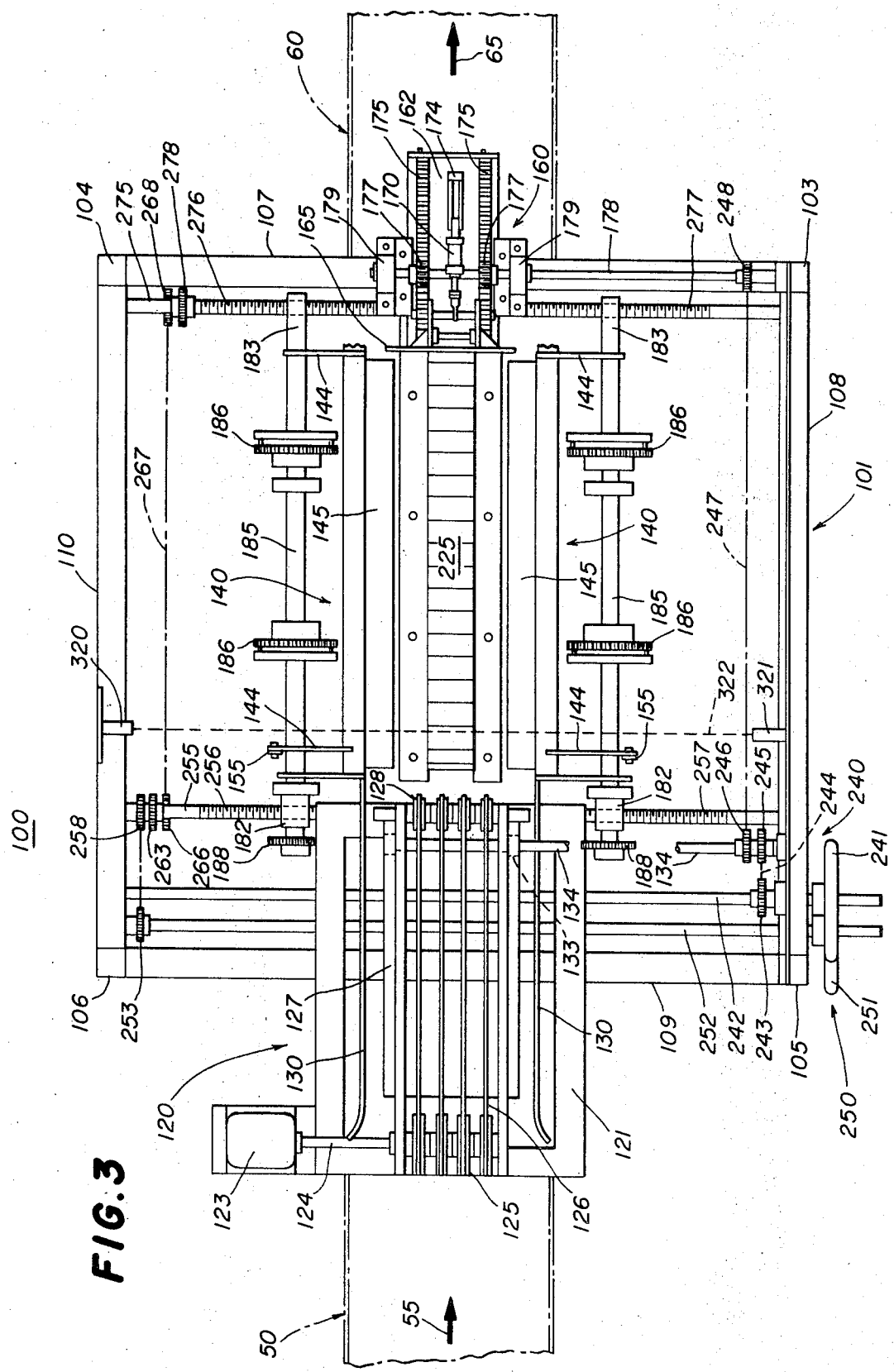
FIG. 3 is a plan view of the machine of FIGS. 1 and 2.

Referring particularly to FIGS. 1 to 3, there is there illustrated an automatic pan stacking machine generally designated by the numeral 100 and incorporating therein the principles of the present invention. The machine 100 has been illustrated as utilized in stacking bread pans, but it will be seen that the machine 100 is of general utility for stacking of other forms of pans and like articles having the requisite physical characteristics and shapes to be described more fully hereinafter.

As illustrated, the machine 100 has associated therewith a supply conveyor 50 which feeds bread pans 70, for example, horizontally in the direction of the arrow 50 in FIGS. 2 and 3, the bread pans 70 being arranged in end-to-end relationship and being fed single file onto an infeed conveyor 120 forming a part of the machine 100. The bread pans 70 are fed one by one from the infeed conveyor 120 onto a support assembly 140 which in cooperation with an air-cushioned pan stop 160 arrests the horizontal movement of the pans and thereafter drops them onto pan carriers 200 supported on elevators 180. As successive bread pans 70 are dropped onto the pan carries 200, the bread pan 70 are formed into a vertically arranged stack 80, and after a full stack 80 has been produced, the stack 80 is fed by a stack discharge conveyor 220 to an associated receiving conveyor 60.

Referring specifically to FIGS. 2 and 3, it will be seen that the supply conveyor 50 includes a longitudinally and horizontally arranged frame 51 supporting a plurality of transversely arranged rollers 53 in the usual manner, whereby readily to convey the bread pans 70 in a generally horizontal direction as indicated by the arrow 55. The receiving conveyor 60 is also of the roller type and includes an elongated and generally horizontally arranged frame 61 supported on vertically extending legs 62, the frame 61 carrying a plurality of transversely extending rollers 63 in the usual manner to facilitate movement of the stack 80 of the bread pans 70 to the right in the direction of the arrow 65.

The bread pans 70 are of the usual construction utilized in commercial bakeries and include a plurality of individual loaf sections 71 interconnected by a pan strap 75 into groups of four, for example. The loaf sections 71 are free-nesting and self-centering, this being a requisite characteristic of the articles to be stacked by the machine 100 of the present invention. Further the pan straps 75 constitute an upper projection 76 extending laterally therefrom and completely therearound and a lower projection 77 also extending laterally therefrom and completely therearound. It will be appreciated that a plurality of the bread pans 70 can be nested and stacked with the pan straps 75 resting one on another, the upper projection 76 of the lower bread pan 70 in the stack 80 supporting the lower projection 77 of the bread pan 70 immediately thereabove in the stack 80.

Referring again to FIGS. 1 to 3 of the drawings, the bread pan stacker 100 includes a main frame generally designated by the numeral 101 and having a base 102 that is substantially flat and arranged to rest upon a suitable underlying support surface such as the usual floor found in commercial bakeries. Extending upwardly from the base 102 are four vertically extending uprights 103, 104, 105 and 106 arranged in the corners of a rectangle as illustrated in FIG. 3. Interconnecting the upper ends of the uprights 103—106 are top frame members 107, 108, 109 and 110. Further, there are provided additional cross frame members 111, 112 and 113 as required interconnecting adjacent pairs of the uprights 103—106 intermediate the ends thereof. As illustrated, each of the members 103 through 113 is formed as a hollow tube square in cross section, thereby to provide good mechanical strength.

Carried by the upper end of the main frame 101, and specifically by the top frame member 109 is the pan infeed conveyor 120, the conveyor 120 including a frame 101 that is generally rectangular in plan as viewed in FIG. 3 and is provided with a suitable brace 122 connected to the main frame 101 intermediate the height thereof. Mounted on the conveyor frame 121 is a conveyor drive motor 123 (See FIG. 3) having an output shaft 124 carrying thereon a plurality of drive sheaves or pulleys 125, four of the pulleys 125 being illustrated. The pulleys 125 cooperate with drive belts 126, respectively, the belts 126 being endless in character and serving to support the bread pans 70 and to convey the bread pans 70 in an impositive manner in the direction of the arrow 135 in FIG. 4. Also mounted upon the frame 121 is a movable subframe 127 which is slidably mounted thereon for longitudinal movement with respect thereto and carrying thereon a first set of movable pulleys 128 disposed to the right as viewed in FIGS. 3 and 4 and a second set of movable pulleys 129 disposed to the left as viewed in FIG. 2. Mounted on the frame 121 and having the axes thereof fixedly positioned with respect thereto is a series of idler pulleys 131. The drive belts 126 extend around the main drive pulleys 125 and then around the movable pulleys 128 and 129 and then around the idler pulleys 131, and then back to the drive pulleys 125, whereby the belts 126 are endless in character as described above. During the feeding of the bread pans 170 by the infeed conveyor 120, the lateral positions thereof are controlled by the side guides 130 (See FIG. 3).

The longitudinal extent of the section of the drive belts 126 engaging the bread pans 70 can be adjusted to accommodate different lengths of the bread pans 70, which adjustment is accomplished by moving the subframe 127 longitudinally with respect to the conveyor frame 121. In order to accomplish such movement between the frames, there has been provided on the subframe 127 a pair of adjusting racks 132 which cooperate with a pair of pinions 133 in engagement therewith and mounted upon a shaft 134 journaled in the fixed frame 121 and rotatable with respect thereto. Rotation of the shaft 134 drives the pinions 133 which in turn move the racks 132 and the attached subframe 127 longitudinally with respect to the fixed frame 121. Since the pulleys 128 and 129 are mounted on the subframe 127 and move therewith, the upper reaches of the belts 126 that engage the bottoms of the bread pans 70 can be lengthened and shortened, this being accomplished simply by rotation of the shaft 134, all as will be explained more fully hereinafter.

The infeed conveyor 120 deposits the bread pans 70 upon the flipper or pan support assembly, generally designated by the numeral 140, positioned at the upper end of the machine 100. The pan support assembly 140 is fundamentally mounted upon four support members 141 that in turn are carried by a movable subframe 181, all as will be described more fully hereinafter. As may be best seen in FIG. 3, the support members 141 are arranged in opposed pairs and each pair of the support members 141 rotatably support therebetween a tube 142. Depending downwardly from each of the tubes 142 is a pair of longitudinally spaced-apart support arms 144 which carry on the ends thereof a flipper or pan support 145, the configuration of the pan support 145 being best illustrated in FIG. 5 of the drawings. Each of the tubes 142 also carries a control lever 143 extending laterally outwardly as viewed in FIG. 5, the control levers 143 being utilized to move the pan supports 145 between a first or pan-supporting position illustrated in FIG. 5 in solid lines and a second pan or release position illustrated in dashed lines in FIG. 5.

Figure 5:
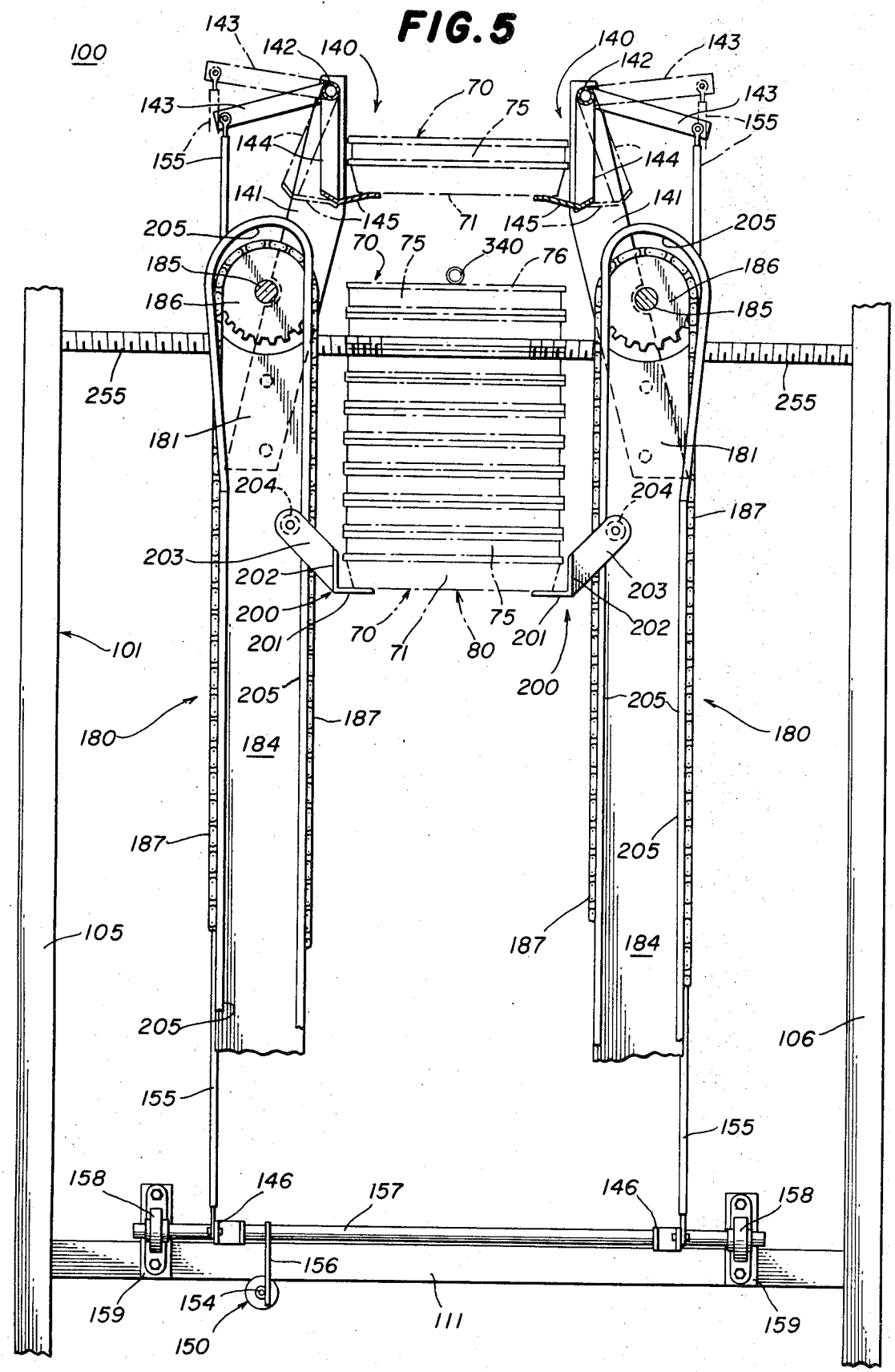
FIG. 5 is a fragmentary view on an enlarged scale in vertical section along the line 5–5 of FIG. 2.

Movement of the supports 146 between the pan-supporting and pan-releasing positions thereof is controlled by a motor 150 (see FIGS. 7 and 8 also), which is in the form of an air cylinder 151 provided with the usual piston (not shown). One end of the air cylinder 151 is pivotally mounted on a pair of brackets 152 fixedly mounted on the cross frame member 111, a bolt 153 serving to interconnect the cylinder 151 and the brackets 152. The piston in the cylinder 151 is connected to a shaft 154 that is reciprocal with respect to the cylinder 151, the outer end of the shaft 154 being pivotally connected to an arm 156 that is in turn fixedly connected to a shaft 157 journaled in a pair of pillow blocks 158 mounted respectively on a pair of frame stubs 159 suitably secured as by welding to the cross frame member 111. Also fixedly secured to the shaft 157 is a pair of arms 146, which arms 146 are pivotally connected at the outer ends thereof, respectively, to control rods 155 that extend upwardly to the control levers 143 and are pivotally connected thereto. Through these connections, the motor 150 controls the positions of the support arms 145 in unison, the motor 150 in the retracted position thereof illustrated in FIG. 8 serving to hold the support arms 145 and the associated parts in the first positions or pan-supporting positions thereof illustrated by solid lines in FIGS. 5 and 8. On the other hand, the motor 150 in the extended position thereof as illustrated in dashed lines in FIG. 8 serves to move the pan supports 145 and the associated parts to the second position or pan-releasing positions thereof as illustrated by dashed lines in FIGS. 5 and 8. Accordingly, when a bread pan 70 is positioned on the pan supports 145 as illustrated in FIG. 5, movement of the pan supports 145 to the release positions illustrated in dashed lines will cause the bread pan 70 supported thereon to be released and fall downwardly under the urging of gravity and onto the stack 80 of bread pans 70 disposed therebelow upon the pan carriers 200.

The bread pans 70 are typically fed at high rates and at high velocities along the supply conveyor 50, typical rates of movement being 60 to 90 feet per minute, whereby, the bread pans 70 have substantial kinetic energy when they arrive at the infeed conveyor 120 and are fed thereby to the pan support assembly 140. It is necessary to arrest the longitudinal movement of the bread pans 70 at the pan support assembly 140 and to dissipate the kinetic energy thereof, this all being accomplished rapidly with each bread pan 70 coming to rest at a predetermined position so that it will properly nest and interfit with the topmost bread pan 70 in the pan stack 80 when deposited thereon.

Figure 10:
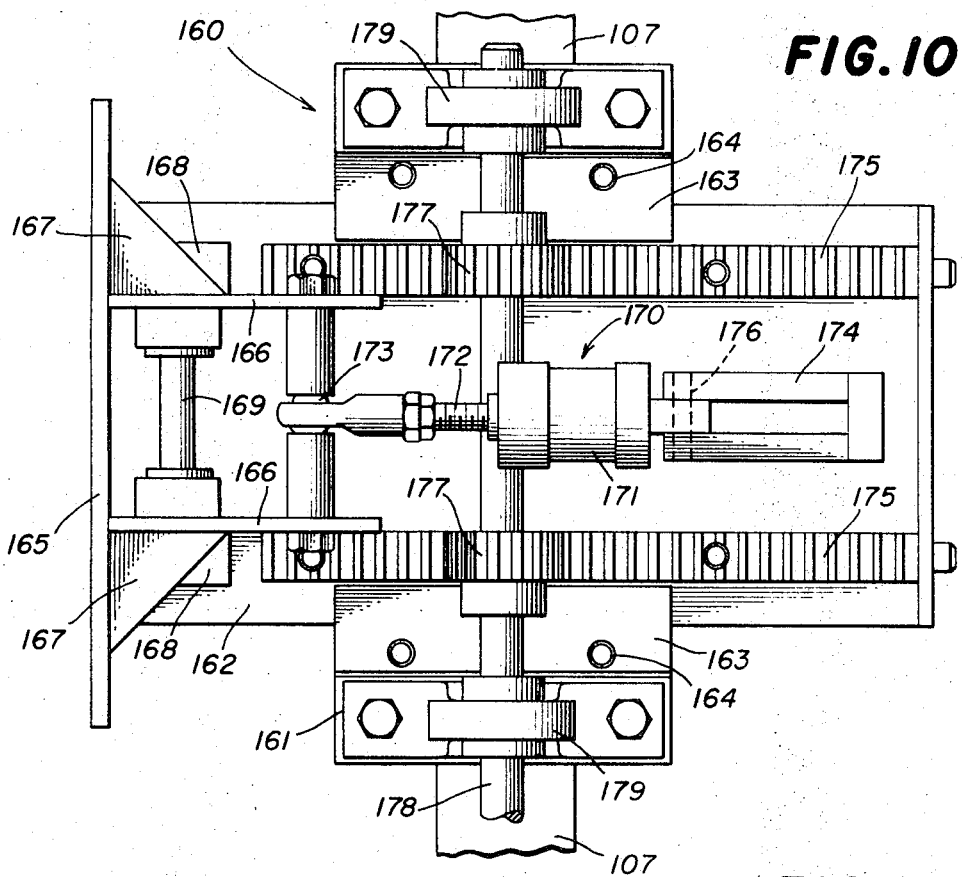
FIG. 10 is a fragmentary plan view on an enlarged scale illustrating the pan stop mechanism.
Figure 11:
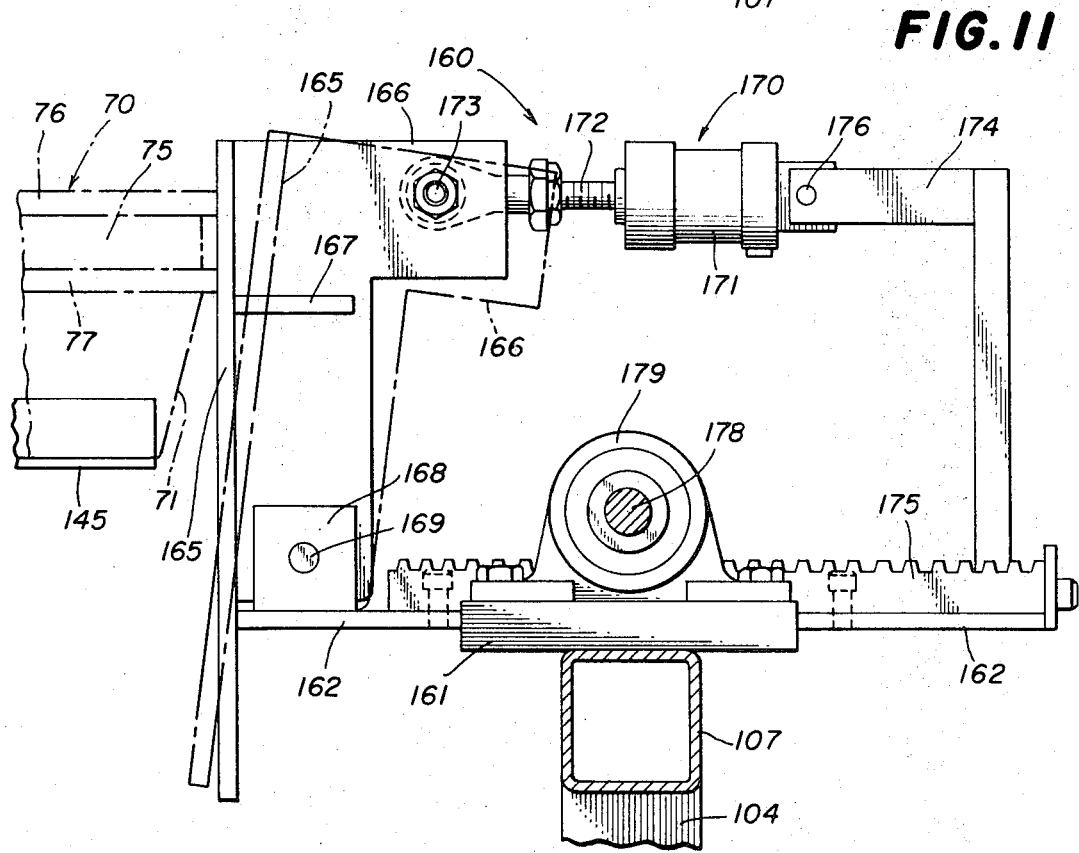
FIG. 11 is a side elevational view of the pan stop mechanism of FIG. 10.

Accordingly, there has been provided the air-cushioned pan stop 160 which is best illustrated in FIGS. 1, 2, 3, 10 and 11 of the drawings. Referring particularly to FIGS. 10 and 11, it will be seen that the pan stop 160 is fundamentally mounted upon the top frame member 107 and includes a slide base 161 that is fixedly secured to the top frame member 107. Carried by the slide base 161 is a generally rectangular slide 162 that is held in sliding relation on the base 161 by a pair of retainers 163 secured to the base 161 by a plurality of suitable fasteners 164. The forward or lefthand end (as viewed in FIGS. 10 and 11) of the slide 162 carries thereon a pan stop plate 165 that is generally rectangular in shape and extends well above the slide 162 and slightly therebelow and is disposed normal to the direction of travel of the bread pans 170 as fed by the infeed conveyor 120. The stop plate 165 carries a pair of L-shaped flanges 166 extending rearwardly therefrom and fixedly secured thereto as by welding, a pair of braces 167 also being provided to reinforce the juncture between the stop plate 165 and the flanges 166. Mounted adjacent to the forward end of the slide 162 are two laterally spaced-apart brackets 168 which are disposed outwardly with respect to but adjacent to the flanges 166 and are pivotally secured thereto by means of a pivot shaft 169, whereby the pan stop plate 165 may be pivoted as diagrammatically illustrated in FIG. 11, by the solid and dashed lines therein.

Disposed between the upper end of the pan stop plate 165 and the slide 162 is a pneumatic cushioning mechanism 170 in the form of an air cylinder 171 which has disposed therein a movable piston (not shown) from which extends outwardly a shaft 172. The outer end of the shaft 172 is pivotally connected as at 173 to the flanges 166 on the pan stop plate 165. The rear end of the cylinder 171 is carried by an L-shaped support 174 mounted on and extending upwardly from the slide 162, the rear end of the air cylinder 171 being pivotally connected to the support 174 as at 176.

The longitudinal position of the slide 162 with respect to the base 161, and the position of the pan stop plate 165 with respect to the discharge end of the conveyor 120, is adjustable, and to this end there is provided on the slide 162 a pair of longitudinally extending and laterally spaced-apart racks 175. Engaging with the racks 175 are two pinions 177, respectively, the pinions 177 both being fixedly mounted upon a transverse shaft 178 that is rotatably mounted in a pair of pillow blocks 179, the pillow blocks 179 being fixedly mounted upon the slide base 161. It will be seen therefore that by suitable rotation of the shaft 178, the pinions 177 carried thereby will coact with the racks 175 to move the slide 162 and the several parts mounted thereon, including the pan stop plate 165, longitudinally thereof and toward and away from the discharge end of the infeed conveyor 120. In this manner different lengths of bread pan 70 can be accommodated upon the pan supports 145 and be centered with respect thereto by suitable adjustment of the pan stop 160, all as will be explained more fully hereinafter.

Disposed below the pan support assembly 140 are the two elevators 180, the elevators 180 being formed as mirror images one of the other, but being otherwise of identical construction, whereby like reference numerals have been applied to like parts thereof, and only one of the elevators 180 will be described in detail. The elevator 180 includes the movable subframe 181 referred to above, the general outlines of which can be best seen in FIG. 4, the frame 181 being mounted upon the main frame 101 by means of a pair of support blocks 182 and 183 that are respectively associated with adjusting support shafts 255 and 275, to be described more fully hereinafter. As has been mentioned heretofore, the support members 141 are mounted upon the subframe 181 and are movable therewith to provide for adjustment of the parts to accommodate different widths of the bread pans 70, all as will be explained more fully hereinafter. Also mounted on the subframe 181 are two laterally spaced-apart elongated plates 184 forming a part of the frame and supporting other parts as will be explained later. Rotatably mounted in the upper portion of the frame 181 is an upper shaft 185 which carries a pair of spaced-apart sprockets 186 fixedly secured thereto and respectively engagable with two chains 187. The lefthand end of the shaft 185 as viewed in FIG. 4 carries a drive sprocket 188 engagable with a drive motor 210 to be described later. The lower ends of the chains 187 are positively guided and supported by a pair of sprockets 196 fixedly mounted on a lower support shaft 195 which is rotatably journaled in a pair of support blocks 190 that in turn are supported by adjusting support shafts 260 and 270, respectively, to be described more fully hereinafter. There also is mounted upon the lower support shaft 195 a pair of spaced-apart bearings 192 that are supported by auxiliary supports 191 extending upwardly from the base 102 and adding additional support for the shaft 195 and the several parts mounted thereon. It further is pointed out that the sprockets 196 are provided with eccentric hubs 197 which can be used to position the sprockets 196 greater or lesser distances from the sprockets 186, thereby to provide for tightening and/or loosening of the drive chains 187, as required.

Mounted on each of the elevators 180 is a pair of pan carriers 200, the construction of which is best illustrated in FIGS. 1, 5 and 9 of the drawings. Each pan carrier 200 includes a support plate 201 and a mounting plate 202 disposed normal to each other and extending longitudinally a substantial distance to engage the bottom of a bread pan 70 disposed thereon. Integral with the mounting plate 202 and extending upwardly and outwardly therefrom as illustrated in FIG. 5 are two arms 203 which carry at the outer ends thereof cam followers 204 respectively. The mounting plate 202 is also pivotally mounted on the adjacent drive chain 187 to be pivotal therewith and with respect thereto, it being appreciated that the two pan carriers 200 on each of the chains 187 are spaced a maximum distance apart thereon so that one of the pan carriers is active in support of a stack 80 while the other is inactive. The position of each of the pan carriers 200 during the entire path of travel of the associated chain 187 is controlled by the cam followers 204 thereof that act against an associated cam track 205 mounted on the associated plate 184 and adjacent to the path of travel of the associated chain 187. In this connection it is noted that the longitudinally opposed pairs of the plates 184 are connected by 3 cross braces 206 in the form of tubes extending therebetween and fixedly secured thereto as by welding. The cooperation between the cam followers 204 and the cam tracks 205 serves positively to control the motion of the pan carriers 200 during the travel thereof with the associated chains 187, it being specifically noted that the pan carriers 200 are in a supporting position when traveling the inwardly disposed reach of the chains 187 as illustrated in FIG. 5 so as to support the pan stack 80 thereon.

The drive for the elevators 180 is derived from the common drive motor 210 provided with the usual output pulley 211 engaging a drive belt 212. The drive belt 212 in turn engages a pulley 213 mounted on the input shaft of a magnetic clutch-brake 215. The output shaft of the magnetic clutch-brake 215 engages a belt 214 which drives a gear reducer 216 having an output shaft 217 carrying a drive sprocket 218. The drive sprocket 218 in turn engages a drive chain 219 that extends upwardly and drivingly engages the drive sprockets 188 on the upper support shafts 185. Accordingly, when both the motor 210 and the clutch 215 are energized, the motor 210 serves to drive both of the elevators via the gear reducer 216, the drive sprocket 218, the drive chain 219 and the drive sprockets 188.

Disposed between the elevators 180 at the bottom of the machine 100 is the stack discharge conveyor 220 which is best illustrated in FIGS. 1, 2, 4, and 6 of the drawings. There is provided a pair of plates 221 extending upwardly from the base 102 and having along the lower edges thereof flanges 222 secured to the base 102 by suitable fasteners. The plates 221 support therebetween an endless conveyor member 225 supported by a pair of sprockets 226, the lefthand sprocket 226 as viewed in FIG. 2 being mounted upon a drive shaft 223 and the righthand sprocket 226 as viewed in FIG. 2 being mounted upon an idler shaft 227. In order to drive the shaft 223, an electrical drive motor 230 has been provided having an output shaft 231 carrying a sprocket 232 that drives a chain 233 engaging a drive sprocket 224 on the drive shaft 223. Operation of the motor 230 serves to cause the upper reach of the conveyor member 225 to move in the direction of the arrow 235 (see FIGS. 4 and 6), thereby to move a stack 80 of the bread pans 70 therealong and onto the receiving conveyor 60 (see FIGS. 2 and 3 also).

As has been mentioned above, the machine 100 can be adjusted to accommodate bread pans 70 of different lengths, and to this end there has been provided an pan length adjust mechanism generally designated by the numeral 240, the details of construction of which are illustrated in FIGS. 1, 2 and 3. In order to accommodate different lengths of the bread pan 70, it is necessary to adjust both the infeed conveyor 120 and the pan stop 160, these adjustments preferably being simultaneous and in as simple a manner as possible. More specifically, the length of the upper reach of the belts 126, i.e., the reach of the belts 126 engaging the bottom of the bread pans 70, must be adjusted to the length of the bread pans 70, and likewise the position of the pan support plate 165 must be positioned toward and away from the discharge end of the conveyor 120, i.e., toward and away from the pulleys 128, all simultaneous with the adjustment of the conveyor 120 so as to maintain the bread pan 70 in a centered position with respect to the longitudinal direction of the pan supports 145 when the bread pan 70 is brought into the arrested position thereof. This is accomplished by providing a single control wheel 241 mounted on a shaft 242 that is suitably journaled in two pillow blocks 249 suitably mounted on the main frame 101. Fixedly secured to the shaft 242 is a sprocket 243 that engages a chain 244 that extends to and engages a sprocket 245 that is fixedly secured to the shaft 134. The shaft 134 also carries a sprocket 246 fixedly secured thereto that engages a chain 247 extending to and engaging a sprocket 248 fixedly mounted on the shaft 178. By this arrangement, it will be appreciated that the rotation of the single control wheel 241 serves to rotate simultaneously the shafts 134 and 178. The shaft 134 drives the pinions 133 which acting with the racks 132 serve to move the subframe 127 and the pulleys 128-129 mounted therein toward and away from the stop plate 165; likewise, rotation of the shaft 178 turns the pinions 177 that engage the racks 175 to move the stop plate 165 toward and away from the conveyor 120. The gearing ratios are selected and arranged so that the pulleys 128 and the pan stop plate 165 move toward and away from each other equal increments for each turn of the control wheel 241. In this manner the machine 100 may be adjusted to accommodate different lengths of bread pans 70 to be stacked thereby.

There also is provided a pan width adjust generally designated by the numeral 250 and best illustrated in FIGS. 1 to 5 of the drawings. The pan width adjust 250 has as its purpose the movement of the elevators 180 toward and away from each other, such movement of the elevators 180 also carrying therewith the pan support assemblies 140 which are mounted respectively thereon. To this end a single control wheel 251 has been provided mounted on one end of a shaft 252 which is suitably mounted as by pillow blocks 254 on the main frame 101. The other end of the shaft 252 carries a sprocket 253 that engages a chain 259 for driving the upper adjusting support shaft 255. The shaft 255 is suitably journaled in the main frame 101 and carries a first thread section 256 at one end thereof and a second thread section 257 at the other end thereof, the pitch of the threads in the sections 256 and 257 being opposite in sense whereby rotation of the shaft 255 serves to move parts engaging these thread sections 256 and 257 toward and away from each other by equal increments; more specifically, the shaft 255 further carries a sprocket 258 that is engaged by the chain 259, whereby turning of the control wheel 251 serves to rotate the shaft 255, the shaft 255 threadedly engaging the support blocks 182 to move the upper ends of the elevators 180 toward and away from each other.

Adjustment of the shaft 255 in turn drives and causes adjustment of the lower adjusting support shafts 260 it being pointed out tht the lower shaft 260 carries two of the support blocks 190 that supports respectively one end of the shafts 195. The shaft 260 also has a first thread section and a second thread section (not illustrated) which are opposite in pitch so as to move the support blocks 190 mounted thereon toward and away from each other in like amounts. In order to adjust the support shaft 260, the shaft 255 carries a sprocket 263 fixedly connected thereto, the sprocket 263 engaging a chain 264 (see FIG. 1) that extends downwardly to engage a sprocket 265 that is fixedly connected on the support shaft 260. The other lower adjusting support shaft 270 carrying the other set of the support blocks 190 is in turn adjusted from the support shaft 260. To this end, the support shaft 260 carries a sprocket 266 (see FIG. 3) engaging a chain 267 that in turn engages a sprocket 260 fixedly connected to the support shaft 270. It will be understood that the support shaft 270 also has a first thread section 271 and a second thread section 272 respectively engaging a support block 290 carried thereby, the thread sections 271 and 272 being opposite in pitch so that rotation of the support shaft 270 causes the support block 190 carried thereby to be moved toward and away from each other by like increments. Finally, the upper adjusting support shaft 275 is adjusted from the lower adjusting support shaft 270. To this end, a sprocket 273 is fixedly secured to the shaft 270 and drives a chain 274 that in turn engages a sprocket 274 fixedly secured to the shaft 275. The shaft 275 is suitably journaled in the main frame 101 and carries thereon a first thread section 276 and a second thread section 277 that support the blocks 183, respectively (see FIG. 4 also). The pitch of the sections 276 and 277 are equal but are of opposite sense whereby rotation of the shaft 275 serves to move the support blocks 183 toward and away from each other by other increments. By the above described connection, it will be appreciated that the support blocks 182 and 183 and 190 supporting one of the elevators 180 move toward and away from the support blocks 182 and 183 and 190 supporting the other one of the elevators 180 when the control wheel 251 is turned. Such movement of the elevators 180 is in unison and by equal increments, whereby the pan carriers 200 are always centered with respect to the longitudinal centerline of the machine 100, even though the spacing therebetween had been adjusted to accommodate this difference in width of the bread pans 70.

There is illustrated in FIG. 12 of the drawings a control circuit 300 for causing the essentially automatic operation of the pan stacking machine 100. The several manual controls included in the control circuit 300 are positioned at any suitable convenient location upon the frame 101 and the major portion of the circuit elements are disposed within a control panel generally designated by the numeral 301 (see FIGS. 2 and 7). The control circuit 300 is operable from a typical commercial electrical source 303 which comprises a 3-wire Edison system including main conductors L1 and L2 and a grounded neutral conductor N. A main ON–OFF switch 302 is provided which serves to connect the conducter L2 to a main distribution conductor 305.

Certain of the components of the control circuit 300 require DC power; accordingly, there has been provided a rectifier 310 having one input terminal thereof connected to the conductor 305 and the other input terminal thereof grounded, the output from the rectifier 310 being provided at the usual output terminals designated B− and B+, respectively which are in turn connected to conductors 311 and 312.

As illustrated, the motor 123 for the infeed conveyor 120 has one terminal thereof connected to the conductor 305 and the other terminal thereof connected to a conductor 379 connecting to control elements therefor described more fully hereinafter. The motor 210 which provides the drive for the elevators 180 has one terminal thereof connected to the main conductor L1 and the other terminal thereof connected to the conductor 305, whereby the motor 210 is continually operating upon closure of the switch 302, the output of the motor 210 being drivingly connected by the pulley 212 and the belt 212 diagrammatically illustrated in FIG. 12 by dashed line to the clutch-brake 215 which is diagrammatically illustrated by the dashed lines in FIG. 12. As illustrated, the clutch-brake 215 includes a brake coil 314 and a clutch coil 315, one of terminals of the clutch coil 315 being connected to the conductor 311 and the other terminal of the clutch coil 315 being connected to a conductor 313. One of the terminals of the brake coil 314 is connected to the conductor 311 and the other terminal thereof is connected to the conductor 316.

Figure 4:
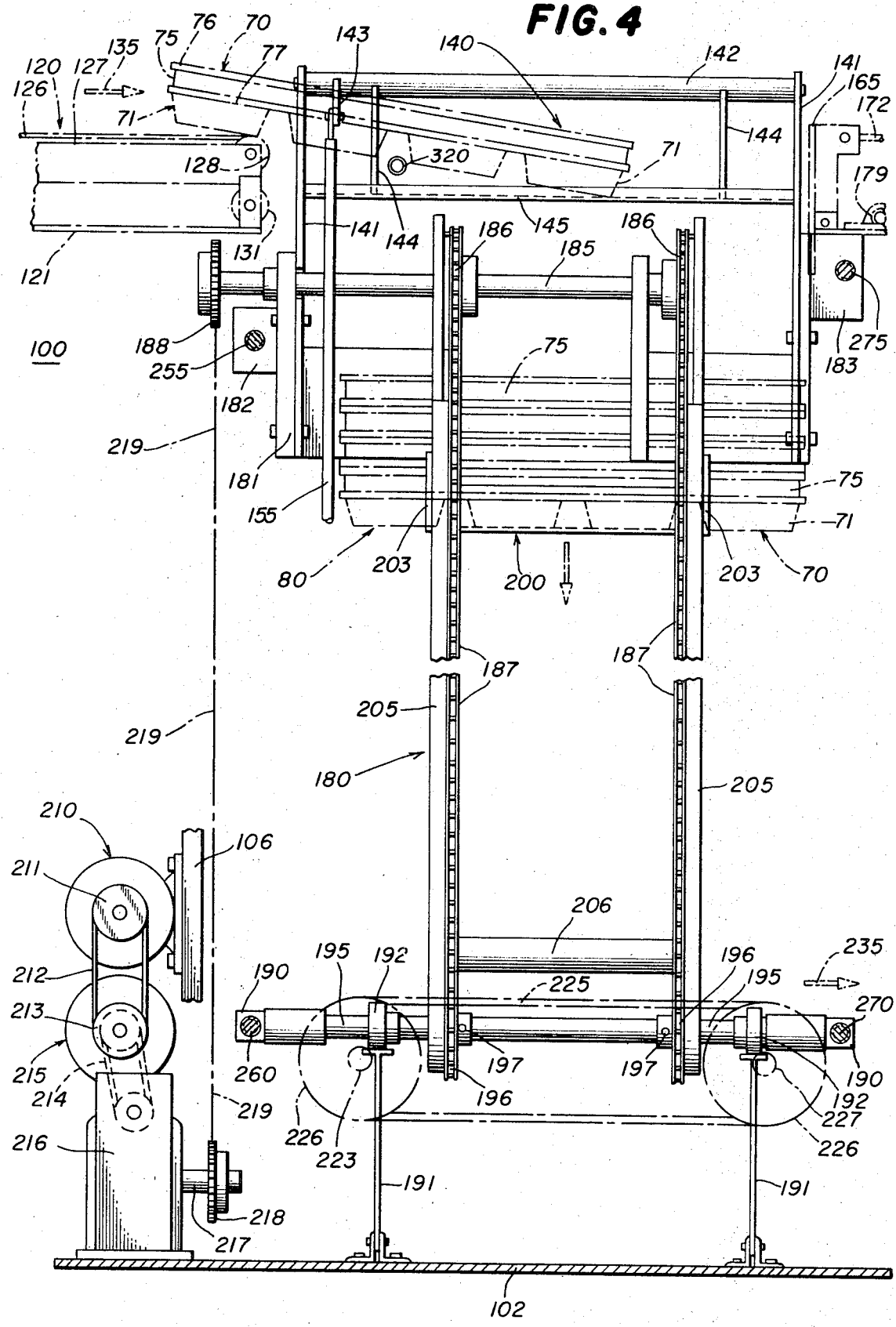
FIG. 4 is a view on a slightly enlarged scale in vertical section along the line 4–4 of FIG. 1.
Figure 6:
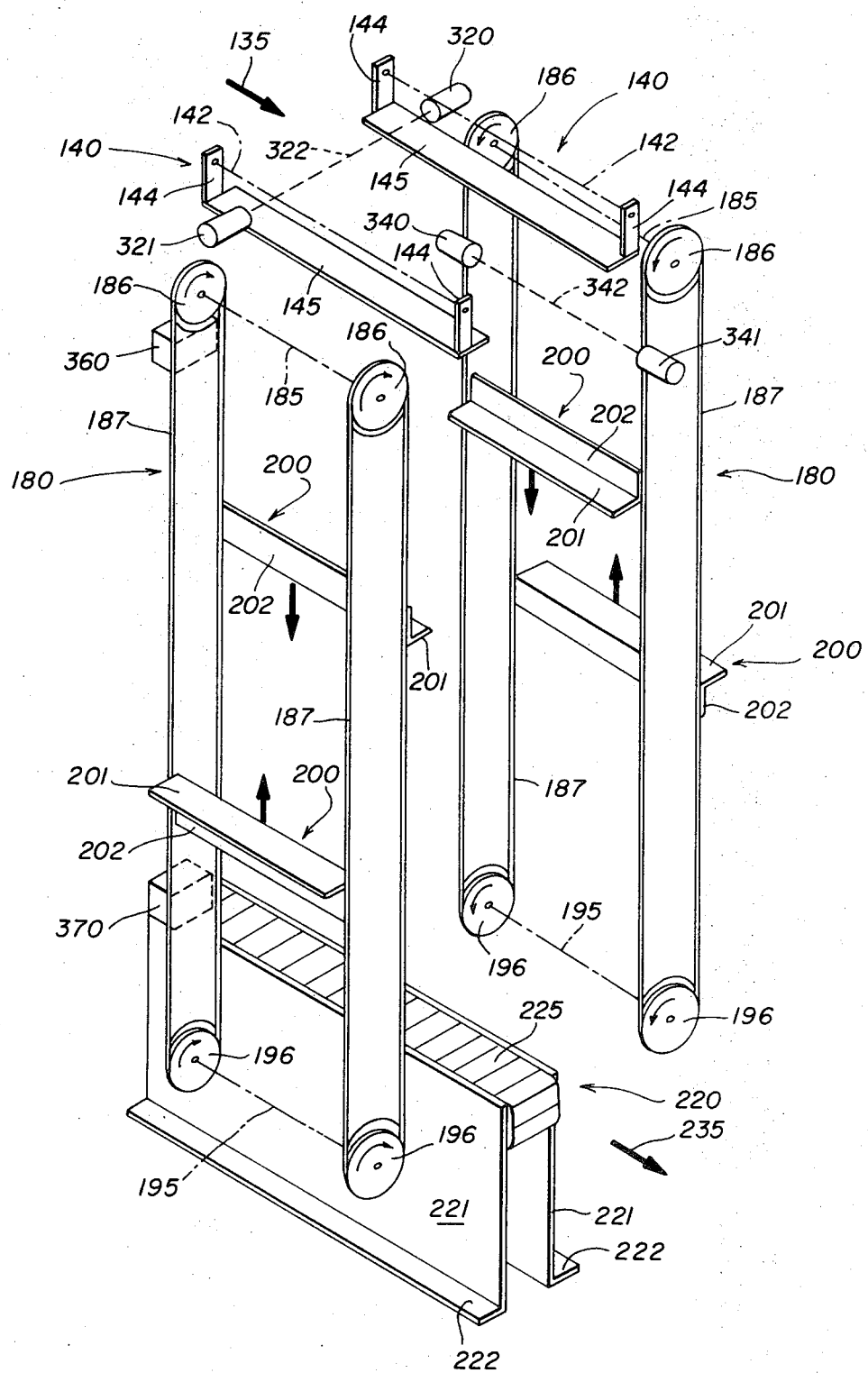
FIG. 6 is a schematic and diagrammatic illustration of certain of the operating parts of the machine of FIGS. 1 to 5.

The air motor 150 is controlled by a photoelectric cell 320 having the usual associated light source 321 establishing a light beam along a path 322 therebetween, the photoelectric cell 320 and the light source 321 therefor being mounted a short distance above the pan supports 145 when in the pan-supporting positions thereof and toward the discharge end of the input conveyor 120 (see FIGS. 4 and 6). The photoelectric cell 320 produces an output signal when a falling bread pan 70 blocks the light path 322, that signal controlling and energizing a relay 325 associated with the photoelectric cell 320. The relay 325 controls a pair of switch contacts 326 which are normally closed and which form part of a control circuit for a solenoid valve 390 that controls the air supply for the air motor 150, one of the terminals of the air solenoid 390 being connected by a conductor 391 to one of the contacts of the pair 326 and the other terminals of the air solenoid 390 being connected to the grounded conductor end. The other contact of the switch pair 326 is connected to a conductor 327 which connects to other parts of the control circuitry to be described hereinafter.

There is provided a main control relay 330 which has one terminal thereof connected to the grounded conductor N and which has the other terminal thereof connected to a conductor 334. The relay 330 as illustrated is provided with three sets of switch contacts 331, 332 and 333. One of the contacts of the switch pair 331 is connected to a conductor 362 and the other is connected to a conductor 386, the switch pair 333 being normally open. One of the contacts of the switch pair 332 is connected to the conductor 317 and the other to the conductor 316, the switch contacts 332 being normally closed. One of the contacts of the switch pair 333 is connected to the conductor 313 and the other to the conductor 317, the switch contacts 333 being normally open.

If often is desirable to discharge from the elevators 180 less than a full stack 80 of the bread pans 70, and to this end there has been provided an eject switch 335 having a first set of contacts 336 and a second set of contacts 337. One of the set of contacts 336 is connected to the conductor 305 and the other is connected to a conductor 338, the switch contacts 336 being normally open. One of the set of switch contacts 337 is connected to a conductor 339 and the other is connected to the conductor 361, the switch contacts 337 being normally closed.

The elevators 180 are automatically operable to lower the stack 80 thereon until the upper end thereof is at a predetermined level, the control of this operation of the elevators 180 being under a photoelectric cell 340 and its associated light source 341. The photoelectric cell 340 and its light source 341 are positioned just below the pan supports 135 and generally along the longitudinal centerline of the machine 100, see FIGS. 1, 2, 5 and 6 of the drawings. There is established between the photoelectric cell 340 and its light source 341 a light beam along the light path 342, the photoelectric cell 340 producing an output upon interruption of the light beam along the path 342 as a bread pan is falling therepast or is disposed therein. Associated with the photoelectric cell 340 and controlled thereby and energized upon receipt of an output signal therefrom is a relay 345 provided with two sets of switch contacts 346 and 347. One of the contacts of the pair 346 is connected to the conductor 334 and the other is connected to a conductor 343, the switch contacts 346 being normally open. One of the contacts of the pair 347 is connected to the conductor 327 and the other is connected to a conductor 344, the switch contacts 347 being normally closed. It will be appreciated that the relay 345 and the relay 325 must also be provided with operating power in addition to the signals received from the photoelectric cells 340 and 320 respectively associated therewith, and to this end one connection for each of the relays is made to the conductor 305 and another connection therefor is made to the grounded conductor N. Likewise, the light sources 321 and 341 must be energized, one of the terminals thereof being connected to the conductor 305 and the other terminals thereof being connected to the grounded conductor N.

After a full stack 80 has been formed on the carriers 200, it is necessary to deposit the full stack 80 upon the stack discharge conveyor 220, and during this operation it is desirable that the infeed conveyor 120 and the pan support assembly 140 be inactivated so that no additional bread pans 70 are deposited upon the full stack 80 during the placement thereof on the stack discharge conveyor 220. To this end a stack eject control relay 350 has been provided, the relay 350 being double-wound and having one of the input terminals thereof connected to the conductor 338 and another input terminal therof connected to the conductor 339 and a common terminal connected to the grounded conductor N. The relay 350 controls four sets of switch contacts 351, 352, 353 and 354. One of the contacts of the switch pair 351 is connected to the conductor 305 and the other to a conductor 356, the switch contacts 351 being normally closed. One of the contacts of the switch pair 352 is connected to the line conductor L2 and the other is connected to a conductor 357, the switch contacts 352 being normally closed. One of the contacts of the switch pair 353 is connected to the B— conductor 312 and the other is connected to the conductor 317, the switch contacts 353 being normally closed. One of the contacts of the switch pair 354 is connected to the B— conductor 312 and the other to the conductor 313, the switch contacts 354 being normally open. Operation of the relay 350 is fundamentally under the control of an eject limit switch 370 which is located immediately above the stack discharge conveyor 220 and in position to be contacted by a pan carrier 200 when a full stack is positioned thereon (see FIG. 6). One terminal of the switch 370 is connected to the conductor 305 and the other is connected to the conductor 338, the switch 370 being normally open.

There also is provided a motor relay 375 controlling the infeed conveyor motor 123, the relay 375 having a single pair of switch contacts 376, one of the switch contacts 376 being connected to a conductor 378 and the other being connected to the conductor 379, the switch contacts 376 being normally open. One of the input terminals of the motor 375 is connected to a conductor 377 and the other terminal thereof is connected to the grounded conductor N.

After a full stack 80 has been deposited upon the stack discharge conveyor 220, it is desirable to move the other pair of pan carriers 200 to a position to start a new stack, i.e., to a position immediately below the pan supports 145, and to stop the pan carriers 200 in this position. To this end a cycle limit switch 360 has been provided disposed adjacent to the upper end of one of the elevators 180 and in position to be contacted by one of the pan carriers 200 when the pan carrier 200 is in position to start the formation of a new pan stack 80 (see FIG. 6). Referring to FIG. 12, it will be seen that one of the terminals of the switch 360 is connected to the conductor 305 and the other terminal is connected to the conductor 361, the switch 360 being normally open. It also is desirable occasionally during the operation of the machine 100 to reset all of the parts in a position to begin operation, and to this end a reset switch 365 has been provided having one terminal thereof connected to the conductor 305 and the other terminal thereof connected to a conductor 366.

Finally, there has been provided a cycle control relay 380 of the double-wound type having one of the input terminals thereof connected to the conductor 366 and having another terminal thereof connected to a conductor 386 and having the common terminal thereof connected to the grounded terminal 214; the relay 380 controls four sets of switch contacts 381, 382, 383 and 384. One of the contacts of the switch pair 381 is connected to the conductor 305 and the other is connected to the conductor 343, the contacts 381 being normally closed. One contact of the pair 382 is connected to the conductor 305 and the other to the conductor 377, the switch contacts 382 being normally closed. One of the contacts of the switch pair 383 is connected to the conductor 356 and the other to the conductor 344, the switch contacts 383 being normally closed. One of the contacts of the switch pair 384 is connected to the conductor 357 and the other to the conductor 358, the switch contacts 384 being normally closed.

In a typical cycle of operation of the bread pan stacker 100, the necessary electrical and pneumatic supplies are connected thereto and the switch 302 is closed. The motor relay 375 is immediately energized by a circuit that can be traced from the conductor 305 through the normally closed switch contacts 382 and the conductor 377 to one terminal of the relay 375, the other terminal being grounded. Operation of the relay 375 closes the switch contacts 376 that completes the circuit for operation of the motor 123, thereby to begin operation of the infeed conveyor 120. More particularly, the circuit for the motor 123 can be traced through the conductor 379, the now closed switch contact 376, the conductor 378, the normally closed switch contact 384, the conductor 357, the normally closed switch contact 352 to the main line conductor L1, and from the other terminal of the motor 123 through the conductor 305 and the now closed switch 302 to the other main line conductor 300.

The elevator drive motor 210 is continually operating and supplies an input to the clutch-brake mechanism 215. An output is obtained from the mechanism 215 to drive the elevators 180 if the clutch 315 is energized. The motor 230 for the stack discharge conveyor 220 is also continually operating and continuously driving the conveyor 220.

The feeding of the first bread pan 70 from the bread pan conveyor 120 onto the pan supports 145 is now begun, the leading end of the bread pan 70 being fed beyond the discharge end of the conveyor 120 until the pan tips downwardly to place the leading end thereof upon the pan supports 145. The leading end of the bread pan 70 is then slid along the pan supports 145 until the pan strikes the air cushioned stop 160, the force of the bread pan 70 striking the plate 165 compressing the air in the cylinder 171 to cushion the stopping of the bread pan 70, and thereafter the air in the cylinder 171 expands to its original condition to move the plate 165 to the normal position and thus to determine the arrested position of the bread pan 70. As soon as the trailing end of the bread pan 70 clears the conveyor 120, the trailing end falls onto the pan supports 145 and breaks the light beam from the light source 321 to the photoelectric cell 320.

The breaking of the light beam to the photoelectric cell 320 causes a signal to be generated, thereby to energize the relay 325, this closing the switch contacts 326. A circuit is now established for the solenoid air valve 390 that can be traced from the conductor 305 via the normally closed switch contacts 351, the conductor 356, the normally closed switch contacts 383, the conductor 344, the normally closed switch contact 347, the conductor 327 and the now closed switch contacts 326 to the conductor 391 connected to one terminal of the solenoid 390, the other terminal being grounded. Energizing the solenoid 390 supplies air to the motor 150 to cause the motor 150 to operate, thereby to move the pan supports 145 from the pan-supporting positions thereof to the pan-releasing positions thereof, thus to drop the bread pan 70 onto the pan carriers 200 disposed therebelow.

The fall of the bread pan 70 onto the pan carriers 200 breaks the light beam of the photoelectric cell 340 which causes the output therefrom to energize the relay 345, this serving to close the switch contacts 346 and to open the switch contacts 347. It will be noted that the fall of the bread pan 70 from the pan supports 145 clears the path of the light beam for the photoelectric cell 320 thus to deenergize the relay 325 opening the switch contacts 326 to deenergize the solenoid 390 and thus interrupts the supply of air to the motor 150 to cause the return thereof to the pan-supporting position, this resulting in the return of the pan supports 145 to the pan-supporting positions thereof. Even if the light beam 325 is not reestablished to cause this action, the motor 150 will be moved to the retracted position due to the opening of the switch contacts 347 thus to insure movement of the pan supports 145 to the pan-supporting positions thereof.

Closure of the switch contacts 346 upon breaking of the light beam 342 operates the main control relay 330 by establishing a connection therefor from the conductor 305 via the normally closed switch contacts 381, the conductor 343, the now closed switch contacts 346 and the conductor 344 to one terminal of the relay 330, the other terminal of the relay 330 being grounded. Energizing of the relay 330 closes the several switch contacts 331, 332 and 333 associated therewith. Closure of the switch contacts 333 serves to energize the clutch coil 315 through a circuit that can be traced from the B+ terminal of the rectifier 310 via the conductor 311, the clutch coil 315, the conductor 313, the now closed switch contacts 333, the conductor 317, the normally closed switch contacts 353 and the conductor 312 back to the B+ terminal. Accordingly, the clutch 215 is energized to connect the motor 210 to the elevators 180 thus to cause operation thereof to lower the stack 80 until the beam 342 can be reestablished. Reestablishment of the beam 342 deenergizes the relay 345, thus to open the contacts 346 and deenergize the control relay 330. Simultaneous with the closing of the switch contacts 333, the normally closed switch contacts 332 are opened whereby to break the circuit for the brake coil 314, thus permitting operation of the clutch 215, the energization circuit for the brake coil 314 being traced from the B+ terminal via the conductor 311, the brake coil 314, the conductor 316, the normally closed switch contacts 322, the conductor 317, the normally closed switch contacts 353 and the conductor 312 to the B− terminal. As soon as the relay 330 is deenergized, the brake coil 314 is again energized to stop the clutch 215. As a result of the aboved-described action, the pan stack 80 is lowered just sufficiently so that the top pan clears the light path 342 for the photoelectric cell 340. In passing it is noted that the closure of the switch contacts 331 effects no operation at this time.

The above-described operations of the infeed conveyor 120, the pan support assembly 140 and the elevators 180 is repeated until a complete stack of bread pans 70 is carried by the pan carriers 200, at which time one of the carriers 200 contacts the limit switch 370 to close the same. Closure of the switch 370 energizes the control relay 350 by a path that can be traced from the conductor 305 through the now closed switch contacts 370, the conductor 338, the associated coil of the relay 350 to the grounded terminal N. Energizing the relay 350 serves to operate the switch contacts 351, 352, 353 and 354 associated therewith. More specifically, opening the switch contacts 351 interrupts the circuit to the solenoid valve 390 so that it will not now be possible to operate the pan supports 145 from the pan-supporting positions thereof into the pan-releasing positions thereof. Opening the switch contacts 352 breaks the circuit for the infeed conveyor motor 123, thus to stop operation thereof. Opening the switch contacts 353 positively prevents application of operating potential to the brake coil 314, while closing the switch contacts 354 immediately applies operating potential to the clutch coil 315, thus connecting the elevator drive motor 210 to the elevator 180 to cause operation thereof so long as the relay 350 is energized. Continued operation of the elevators 180 in this manner eventually deposits the full stack 80 upon the stack discharge conveyor 220 which is continually operating, thereby to move the stack 80 from the maching 100 and to deposit it upon the conveyor 60.

The one of the uppermost carriers 200 then contacts the limit switch 360 which also provides a path for energizing the relay 350, that path being traced from the conductor 305 through the now closed switch contacts 360, the conductor 361, the normally closed switch contacts 337 and the conductor 339 to the other coil of the relay 350. As a result, the elevators 180 continue to operate until the upper pan carrier 200 clears the limit switch 360, at which time the relay 350 is deenergized this serving to deenergize the clutch coil 315 and to energize the brake coil 314 to stop movement of the elevators 180. It is noted that the purpose of the relay 380 is to prevent inadvertent operation of the infeed conveyor 120 and the pan supports 145 during the stack discharge operation and pan carrier positioning operation just described.

Summarizing the operation of the automatic pan stacker 100, after supplying thereto the necessary electrical power and the air supply for the motor 150, the operator closes the main control switch 302 to energize the control circuit 300. This begins operation of the feed conveyor 120 driven by the motor 123 to move a bread pan 70 onto the pan supports 145 and against the air-cushioned pan stop 160, the falling bread pan 70 being properly positioned longitudinally along the pan supports 145. The falling of the trailing end of the bread pan 70 onto the pan supports 145 breaks the light beam 322 and energizes the relay 325. As a result, the air motor 150 is operated to swing the pan supports 145 apart thus to drop the bread pan 70 upon the pan carriers 200 positioned therebelow.

The falling bread pan 70 breaks the beam 342 of the photoelectric cell 340 to energize the relay 345. This causes the clutch coil 315 to be energized thus to connect the motor 210 to the elevators 180 to cause the pan carriers 200 and the pan thereon to be moved downwardly until the beam 342 is cleared. When the beam 342 is cleared, the relay 340 is deenergized which serves to deenergize the clutch coil 315 and to energize the brake coil 314, thus to stop the elevators 180.

The bread pan 70 having fallen from the pan supports 145, the beam 322 for the photoelectric cell 320 is again established thus deenergizing the relay 325 and thus to cause the pan supports 145 to swing toward one another and into the pan-supporting position thereof, this being under the control of the air motor 150. The operation of the infeed conveyor 120 and the pan supports 145 and the elevators 180 as described above is repeated, thus sequentially to receive and to stack the bread pans 70 on the stack 80 until a full stack 80 is formed.

As soon as the full stack 80 has been formed on the pan carriers 200, the one of the lower pan carriers 200 contacts the limit switch 370 to cause the energization of the control relay 350. Energization of the relay 350 inactivates the circuit for the air motor 150, thus to prevent any additional pans from being dropped thereby. The infeed conveyor 120 is also stopped by deenergizing the motor 123 therefor. The drive for the elevators 180 is established by operating the clutch 215 to cause the pan carriers 200 to continue downwardly to deposit the completed stack 80 on the discharge conveyor 220. The discharge conveyor 220 is operated continuously and thus serves to move the completed stack 80 to the conveyor 60.

Operation of the elevators 180 continues until one of the upper pan carriers 200 contacts the limit switch 360, this serving to continue energization of the control relay 350. As soon as the upper pan carrier 200 moves out of contact with the limit switch 360 to permit it to open, the clutch 215 is deenergized and the brake applied to stop the upper pan carriers in positions to start a new stack. The circuit for the motor 123 is now reenergized and the infeed conveyor 120 proceeds to operate. The circuitry for the air motor 150 is also now reactivated so that it is under the control of the photoelectric cell 320 as described above.

While there has been described what is at present considered to be the preferred embodiment of the invention, it will be understood that various modifications may be made therein, and it is intended to cover in the appended claims all such modifications as fall within the true spirit and scope of the invention.

I claim:

1. A machine for stacking bread pans and the like comprising an infeed conveyor for conveying pans, pan support means mounted adjacent to the discharge end of said infeed conveyor and disposed at an elevation below that of said infeed conveyor, said pan support means having a first position for receiving and arresting the movement of pans from said infeed conveyor to place the pans in a predetermined position and a second position for releasing an arrested pan to permit the arrested pan to drop under the urging of gravity, the trailing end of the pan falling from said infeed conveyor upon said pan support means to place the pan in said predetermined position, a pan carrier mounted below said pan support means in position to catch the pan dropped therefrom, support drive mechanism for moving said pan support means between the first and second positions thereof sequentially to arrest a pan and to drop an arrested pan upon said pan carrier to form a stack of pans thereon, carrier drive mechanism for moving said pan carrier downwardly and away from said pan support means as pans are stacked on said pan carrier, a photoelectric pan position detector for detecting the presence of the trailing edge of a pan falling upon said pan support means from said infeed conveyor to place a pan in said predetermined position on said pan support means, and control mechanism responsive to the sensing by said photoelectric detector of a pan in said predetermined position upon said pan support means for operating said support drive mechanism to move said pan support means from the first position thereof to the second position thereof to drop the pan positioned thereon and thereafter to move said pan support means to the first position thereof.

2. The machine set forth in claim 1, wherein said support drive mechanism is an air motor.

3. The machine set forth in claim 1, wherein said carrier drive mechanism moves said pan carrier downwardly in a stepwise manner as pans are stacked thereon.

4. A machine for stacking bread pans and the like comprising an infeed conveyor for conveying pans, a pair of laterally spaced-apart elongated pan support means mounted adjacent to the discharge end of said infeed conveyor with the longitudinal axes thereof extending in the direction of said infeed conveyor and disposed at an elevation below that of said infeed conveyor, said pan support means having first positions for receiving and arresting the movement of pans from said infeed conveyor to place the pans in a predetermined position and second positions for releasing an arrested pan to permit the arrested pan to drop under the urging of gravity, the trailing end of the pan falling from said infeed conveyor upon said pan support means to place the pan in said predetermined position, a pair of laterally spaced-apart elongated pan carriers mounted below said pan support means in position to catch a pan dropped therefrom, support drive mechanism for moving said pan support means laterally between the first and second positions thereof sequentially to arrest a pan and to drop an arrested pan upon said pan carriers to form a stack of pans thereon, carrier drive mechanism for moving said pan carriers downwardly in unison and away from said pan support means as pans are stacked on said pan carriers, a photoelectric pan positioned detector for detecting the presence of the trailing edge of a pan falling upon said pan support means from said infeed conveyor to place a pan in said predetermined position, and control mechanism responsive to the sensing by said photoelectric detector of a pan in said predetermined position upon said pan support means for operating said support drive mechanism to move said pan support means from the first positions thereof to the second positions thereof to drop the pan positioned thereon and thereafter to move said pan support means to the first positions thereof.

5. The machine set forth in claim 4, wherein the lateral spacing of said pan support means in the first positions thereof are adjustable to accommodate different widths of pans.

6. The machine set forth in claim 4, wherein the lateral spacing of said pan carriers is adjustable to accommodate different widths of pans.

7. The machine set forth in claim 4, and further comprising adjusting mechanism for simultaneously adjusting from a single control member the lateral sapcing between said pan support means when in the first positions thereof and between said pan carriers to accommodate different widths of pans thereon.

8. The machine set forth in claim 4, and further comprising a stack discharge conveyor disposed between said pan carriers adjacent to the lower end of the path of travel thereof for receiving a stack of pans therefrom and conveying the stack of pans out of said machine.

9. A machine for stacking bread pans and the like comprising an infeed conveyor for conveying pans, pan support means mounted adjacent to the discharge end of said infeed conveyor and disposed forwardly thereof and downwardly with respect thereto, said pan support means having a first position for receiving and arresting the movement of pans from said infeed conveyor to place the pans in a predetermined position and a second position for releasing an arrested pan to permit the arrested pan to drop under the urging of gravity, the leading end of a pan fed from said infeed conveyor tilting downwardly to rest upon said pan support means and to slide therealong until the trailing end of the pan falls from said infeed conveyor upon said pan support means to place the pan in said predetermined position, a pan carrier mounted below said pan support means in position to catch a pan dropped therefrom, support drive mechanism for moving said pan support means between the first and second positions thereof sequentially to arrest a pan and to drop an arrested pan upon said pan carrier to form a stack of pans thereon, carrier drive mechanism for moving said pan carrier downwardly and away from said pan support means as pans are stacked on said pan carrier, a photoelectric pan position detector mounted adjacent to said pan support means and disposed immediately thereabove and adjacent to the discharge end of said infeed conveyor to detect the falling of the trailing end of a pan onto said pan support means to place the pan in said predetermined position, and control mechanism responsive to the sensing by said photoelectric detector of a pan in said predetermined position upon said pan support means for operating said support drive mechanism to move said pan support means from the first position thereof to the second position thereof to drop the pan positioned thereon and thereafter to move said pan support means to the first position thereof.

10. The machine set forth in claim 9, and further comprising a positive stop mounted above said pan support means and spaced from the discharge end of said infeed conveyor for controlling the longitudinal position of a pan upon said pan support means.

11. A machine for stacking bread pans and the like comprising an infeed conveyor for conveying pans, pan support means mounted adjacent to the discharge end of said infeed conveyor and disposed at an elevation below that of said infeed conveyor, said pan support means having a first position for receiving and arresting the movement of pans from said infeed conveyor to place the pans in a predetermined position and a second position for releasing an arrested pan to permit the arrested pan to drop under the urging of gravity, the trailing end of the pan falling from said infeed conveyor upon said pan support means to place the pan in said predetermined position, a pan carrier mounted below said pan support means in position to catch a pan dropped therefrom, support drive mechanism for moving said pan support means between the first and second positions thereof sequentially to arrest a pan and to drop an arrested pan upon said pan carrier to form a stack of pans thereon, said support drive mechanism being actuated in response to the trailing edge of a pan falling upon said pan support means from said infeed conveyor to place the pan in said predetermined position on said pan support means, carrier drive mechanism for moving said pan carrier downwardly and away from said pan support means as pans are stacked thereon, a photoelectric stack position detector positioned at a predetermined point below said pan support means in the first position thereof for sensing the presence of a stack of pans extending upwardly beyond said predetermined point, and control mechanism responsive to the sensing by said photoelectric detector of a stack of pans extending upwardly beyond said predetermined point for operating said carrier drive mechanism to move said pan carrier downwardly from said pan support means until the upper end of the stack of pans on said pan carrier is below said predetermined point.

12. A machine for stacking bread pans and the like comprising an infeed conveyor for conveying pans, pan support means adjacent to the discharge end of said infeed conveyor and disposed at an elevation below that of said infeed conveyor, said pan support means having a first position for receiving and arresting the movement of pans from said infeed conveyor to place the pans in a predetermined position and a second position for releasing an arrested pan to permit the arrested pan to drop under the urging of gravity, the trailing end of the pan falling from said infeed conveyor upon said pan support means to place the pan in said predetermined position, a pan carrier mounted below said pan support means in position to catch a pan dropped therefrom, support drive mechanism for moving said pan support means between the first and second positions thereof sequentially to arrest a pan and to drop an arrested pan upon said pan carrier to form a stack of pans thereon, carrier drive mechanism for moving said pan carrier downwardly and away from said pan support means as pans are stacked on said pan carrier, a first photoelectric detector for detecting the presence of the trailing edge of a pan falling upon said pan support means from said infeed conveyor to place a pan in said predetermined position on said pan support means, first control mechanism responsive to the sensing by said first photoelectric detector of a pan in said predetermined position upon said pan support means for operating said support drive mechanism to move said pan support means from the first position thereof to the second position thereof to drop the pan positioned thereon and thereafter to move said pan support means to the first position thereof, a second photoelectric detector positioned at a predetermined point below said pan support means in the first position thereof for sensing the presence of a stack of pans extending upwardly beyond said predetermined point, and second control mechanism responsive to the sensing by said second photoelectric detector of a stack of pans extending upwardly beyond said predetermined point for operating said carrier drive mechanism to move said pan carrier downwardly away from said pan support means until the upper end of the stack of pans on said pan carrier is below said predetermined point.

13. A machine for stacking bread pans and the like comprising an infeed conveyor for conveying pans, pan support means mounted adjacent to the discharge end of said infeed conveyor, and disposed at an elevation below that of said infeed conveyor, said pan support means having a first position for receiving pans from said infeed conveyor and a second position for dropping pans from said pan support means under the urging of gravity, the trailing end of the pan falling from said infeed conveyor upon said pan support means to place the pan in said predetermined position, a stop plate movably mounted adjacent to said pan support means at the end thereof opposite said infeed conveyor for engaging the adjacent end of a pan as it is fed onto said pan support means in the first position thereof to arrest the movement of the pan in a predetermined position, cushion mechanism for said stop plate for absorbing the kinetic energy of the pans in arresting the movement thereof and for returning said stop plate to a predetermined position so as to place the pans in a predetermined position, a pan carrier mounted below said pan support means in position to catch a pan dropped therefrom, support drive mechanism for moving said pan support means between the first and second positions thereof sequentially to arrest a pan and to drop an arrested pan upon said pan carrier to form a stack of pans thereon, said support drive mechanism being actuated in response to the trailing edge of a pan falling upon said pan support means from said infeed conveyor to place the pan in said predetermined position on said pan support means, and a carrier drive mechanism for moving said pan carrier

14. The machine set forth in claim 13, wherein said stop plate is pivotally mounted for cushioned pivotal movement away from the discharge end of said infeed conveyor.

15. The machine set forth in claim 13, wherein said cushion mechanism is an air cushion mechanism.

16. A machine for stacking bread pans and the like comprising an infeed conveyor for conveying pans, pan support means mounted adjacent to the discharge end of said infeed conveyor and disposed at an elevation below that of said infeed conveyor, said pan support means having a first position for receiving and arresting the movement of pans from said infeed conveyor to place the pans in a predetermined position and a second position for releasing an arrested pan to permit the arrested pan to drop under the urging of gravity, the trailing end of the pan falling from said infeed conveyor upon said pan support means to place the pan in said predetermined position, a pair of elevators mounted below said pan support means and each including an upper drive sprocket positioned immediately below said pan support means and a lower drive sprocket disposed vertically below said upper drive sprocket and a drive chain interconnecting said drive sprockets, two pan carriers respectively mounted on said drive chains and being horizontally aligned and in position to catch a pan dropped from said pan support means when on the adjacent facing reaches respectively of said chains, support drive mechanism for moving said pan support means between the first and second positions thereof sequentially to arrest a pan and to drop an arrested pan upon said pan carrier to form a stack of pans thereon, said support drive mechanism being actuated in response to the trailing edge of a pan falling upon said pan support means from said infeed conveyor to place the pan in said predetermined position on said pan support means, carrier drive mechanism for driving said sprockets to move said pan carrier downwardly when on the inner facing reaches of said chains and away from said pan support means as pans are stacked on said pan carriers, means for detecting the presence of a pan in said predetermined position on said pan support means, and control mechanism responsive to the sensing by said detecting means of a pan in said predetermined position upon said pan support means for operating said support drive mechanism to move said pan support means from the first position thereof to the second position thereof to drop the pan positioned thereon and thereafter to move said pan support means to the first position thereof.